United States Patent
Saylor et al.

[11] Patent Number: 6,107,769
[45] Date of Patent: Aug. 22, 2000

[54] POSITIONAL-BASED MOTION CONTROLLER WITH A BIAS LATCH

[75] Inventors: Michael J. Saylor, Carlisle, Mass.; Nathan H. Pillsbury, Scarborough, Me.

[73] Assignee: Schneider Automation Inc., North Andover, Mass.

[21] Appl. No.: 09/222,515

[22] Filed: Dec. 29, 1998

[51] Int. Cl.$^7$ .................................................. G05B 19/29
[52] U.S. Cl. .................... 318/600; 319/609; 319/610; 319/570; 369/34
[58] Field of Search ................................... 318/560–696; 369/30, 34, 32, 43; 187/292, 116, 316; 395/80–99; 83/53; 65/160

[56] References Cited

U.S. PATENT DOCUMENTS

| | | | |
|---|---|---|---|
| 4,639,172 | 1/1987 | Kishi et al. | 409/80 |
| 4,988,935 | 1/1991 | York | 318/568.18 |
| 5,033,039 | 7/1991 | Richgels | 369/43 |
| 5,040,159 | 8/1991 | Oliver et al. | 369/34 |
| 5,050,146 | 9/1991 | Richgels et al. | 369/32 |
| 5,057,758 | 10/1991 | Oliver et al. | 318/603 |
| 5,076,399 | 12/1991 | Horbruegger et al. | 187/116 |
| 5,105,367 | 4/1992 | Tsuchihashi et al. | 395/99 |
| 5,134,600 | 7/1992 | Oliver et al. | 369/34 |
| 5,164,928 | 11/1992 | Oliver et al. | 369/34 |
| 5,231,616 | 7/1993 | Oliver et al. | 369/34 |
| 5,359,409 | 10/1994 | Wildnauer et al. | 356/334 |
| 5,384,439 | 1/1995 | Ernecke et al. | 187/316 |
| 5,394,323 | 2/1995 | Yellowley et al. | 364/167.01 |
| 5,425,794 | 6/1995 | Frederick et al. | 65/160 |
| 5,428,587 | 6/1995 | Wanger et al. | 369/30 |
| 5,635,689 | 6/1997 | Shepard et al. | 187/292 |
| 5,636,558 | 6/1997 | Sanders et al. | 83/53 |
| 5,917,294 | 6/1999 | Mitarai | 318/41 |

OTHER PUBLICATIONS

"Application Note for Sync–Ratio" distributed Jun., 1997.

*Primary Examiner*—Paul Ip
*Attorney, Agent, or Firm*—Michael J. Femal; Larry I. Golden

[57] ABSTRACT

A motion controller and a method of controlling the motion of a plurality of axes which prevents a discontinuous position command being generated to a follower axis. A follower mode transfer function circuit or routine generates a position command in response to a master axis position. This function can be in the form of electronic gearing or camming. A bias latch is utilized to offset any change in position resulting from a change in mode, such as changing from electronic gearing to electronic camming, changing cam profiles or gearing ratios, or changing the master axis. The latch is summed with the transfer function position command and a standard move command profile generator position command to provide the follower axis position command. The latch is recalculated each time the follower mode is changed. A halt command can be used to selectively block or enable an independent move command signal, allowing the follower axis to remain in motion when the follower mode is turned off (not following the master axis), or allowing the follower mode to be turned on while the follower axis is in motion without a sudden change in position. Trigger calculation circuitry is used to precalculate timing for activating the follower mode when follower mode is changed from off to on while the follower axis is already in motion such that the axes are in phase after ramping time.

26 Claims, 9 Drawing Sheets

2

POSITIONAL-BASED MOTION CONTROLLER WITH A BIAS LATCH

TECHNICAL FIELD

The present invention generally relates to a motion controller and a method for controlling a plurality of axes which prevents a jerk in motion upon a change of mode, and more particularly to a motion controller and method for controlling the motion of a follower axis which moves in response to the position of a master axis, and preventing a discontinuous position command to the follower axis resulting from a change of the follower mode.

BACKGROUND OF THE INVENTION

There are a variety of applications which require synchronized motion between a plurality of components. In such environments, each component is typically referred to as an axis. Movement of an axis may be rotational, linear, or some other more complex motion.

Some applications require one axis to move in response to another axis, such as electronic gearing, or electronic camming operations. In such applications, for example, a motion controller can be used to move a follower axis in response to the position of a master axis.

Many motion controllers provide electronic gearing and camming features in their products. For example, Schneider Automation Modicon motion controllers provide electronic gearing or camming. The 3220/3240 CyberBasic motion controllers also feature both gearing and camming. However, the CyberBasic controllers requires users to position the follower axis in the correct position before turning the camming "on." Other known controllers, such as the QMOT and BMOT single axis controllers, feature electronic gearing but not camming.

Certain problems exist for motion controllers capable of changing modes of operation. As in the CyberBasic motion controllers, users are required to position a follower axis prior to turning a particular mode "on." In other controllers, changing the mode abruptly changed the desired position of the follower axis, which immediately attempted to move to the new mode's desired position. This created a jerk in the movement which could wear or damage the axis.

Prior controllers lack mechanisms for allowing a follower axis to continue to move at a specified rate after a command has been issued to turn the follower mode "off," (command the follower axis to stop responding to the master axis), or to allow the follower mode to be turned "on" while the follower axis is in motion without causing sudden jumps in follower axis position. Furthermore, prior controllers required that out of phase axes be manually adjusted after turning the follower mode "on" in order to synchronize them, or to require the follower mode to be turned on from a follower axis stopped state only.

The present invention provides a motion controller and a method of controlling the motion of a follower axis which does not require a user to position the follower axis prior to turning a mode "on," and which prevents a jerk in movement when changing modes.

SUMMARY OF THE INVENTION

The present invention is directed to a motion controller which prevents a discontinuous position command to a follower axis when a follower mode is changed. The motion controller includes a move profile generator which generates a move profile position value or command, a transfer function position generator which generates a transfer function position value, and a latch which generates a bias position value. The move profile position value, the transfer function position value and the bias position value are provided to a command summer which generates a follower axis position value or command in response to the move profile position value, the transfer function position value and the bias position value. The follower axis position value controls the position of the follower axis.

The bias position value offsets a change in the transfer function position value resulting from a change in the follower mode. That is, the bias position value cancels any disruption to the follower axis position command when the follower mode transfer function is changed. The bias position value is calculated in response to a change in the follower mode.

The move profile generator generates a move profile value or command which smoothly moves the follower axis in synch with the master axis. As is understood in the art, the move profile generator can function to slowly ramp the follower axis up to the desired speed, and slowly ramp the follower axis down to zero. The move profile generator can also function to move the follower axis in phase with the master axis.

The transfer function position generator generates the transfer function position value in response to a master axis position value. In one mode of operation, the transfer function position value is a constant multiplier value times the master axis position value (i.e., electronic gearing). This constant multiplier value can be changed from a first value to a second value. The bias position value changes in response to a change in the constant multiplier value.

In another mode of operation, the transfer function position generator includes a first transfer function lookup table which provides a first transfer function position value in response to a particular master axis position value (i.e., electronic camming). The mode can be changed so that the transfer function position generator includes a second transfer function lookup table which provides a second transfer function position value in response to the particular master axis position value. The bias position value changes in response to a change from the first lookup table to the second lookup table.

The follower mode can change by turning the following mode "on" or "off." The follower mode can also change by changing the value of the constant multiplier of the transfer function, or changing the lookup table. Additionally, the follower mode can change by switching from an electronic gearing operation to an electronic camming operation, or from an electronic camming operation to an electronic gearing operation, or by changing the master axis to a new master axis. In each case, the bias position value is calculated to offset a discontinuous follower axis position value being generated.

In a broader sense, the invention provides a motion controller including circuitry for generating a first position value in response to a first axis position value, and circuitry for generating a second position value which offsets a change in the first position value due to a change in a mode of operation of the circuitry for generating a first position value. The motion controller also includes circuitry for generating a second axis position value in response to the first position value and the second position value. As used herein, the "circuitry" can be either hard wired, a software routine, or any combination thereof.

The motion controller can further include circuitry for generating a third position value for moving the second axis in synch with the first axis. In this case the circuitry for generating a second axis position value generates the second axis position value in response to the third position value in addition to the first position value and the second position value.

The invention also includes a method of preventing a discontinuous position command to a follower axis when a follower mode is changed. The method includes the steps of providing a master axis position value and generating a transfer function position value in response to the master axis position value. The method also includes generating a move profile position value, generating a bias position value which offsets a change in the transfer function position value due to a change in the follower mode; and generating a follower axis position value in response to the move profile position value, the transfer function position value, and the bias position value.

The motion controller and method of the present invention avoids the standard problem with electronic camming (and electronic gearing when implemented in a positional mode rather than a velocity mode) of requiring the position of the follower axis to be in the correct position when camming (or positional gearing) is turned on.

It is sometimes desirable to enable a follower axis to continue to move at a specified rate once the follower mode is turned "off." For example, if the motion controller is operating a conveyor belt system in which articles to be packaged are moved via a master axis, and packaging material is disposed upon the articles via a follower axis, if the system must be taken off line, it may be desirable to keep both axes moving so that items are not backed up. The motion controller of the present invention includes an independent move command to provide input for the standard move command profile generator. Such input may be selectively blocked or enabled by a halt command. By choosing to enable the input when the follower mode is turned off, the input may be used to allow the follower axis to continue movement independent of the master axis.

Furthermore, the halt command may be activated to block the independent move command signal when the follower mode is turned on from a moving state without the follower axis suddenly jumping in response to a sum of the current velocity and the transfer function output.

The motion controller of the present invention can also include trigger calculation circuitry which enables the axes to be automatically placed in phase after the follower mode is turned on from a moving state of the follower axis. The calculation takes into account ramping rates and present parameters to precalculate the timing needed for the follower mode to be turned on such that the axes are in synch after ramping to speed.

The invention further provides for a method of selectively enabling a follower axis to remain in motion when a follower axis mode is deactivated, and enabling the follower axis mode to be activated while the follower axis is in motion without a discontinuous position command to the follower axis. The method includes the steps of generating an independent velocity value; generating a halt command; generating a follower axis mode signal; generating a move profile position value in response to the independent velocity value and the halt command; providing a master axis position value; generating a transfer function position value in response to the master axis position value; generating a bias position value which offsets a change in the transfer function position value due to a change in the follower mode; and generating a follower axis position value in response to the move profile position value, the transfer function position value, and the bias position value. The move profile position value and the transfer function values can be ramped from starting values to ending values in response to a change in halt command or follower axis mode, and the ramping rates can be equalized. Additionally, a triggering time based on the present position and velocity of the follower axis can be precalculated, wherein the follower axis and the master axis are placed in synch after the ramping of the transfer function position value and the ramping of the move profile position value when the follower axis mode is activated according to the triggering time, thereby enabling the follower mode to be activated while the follower axis is in motion, and the axes will be in synch without further adjustment.

Further aspects of the invention are described in the detailed description of the preferred embodiment and the claims, and are shown in the drawings.

DETAILED DESCRIPTION OF THE PREFERRED EMBODIMENT

Figure 1:
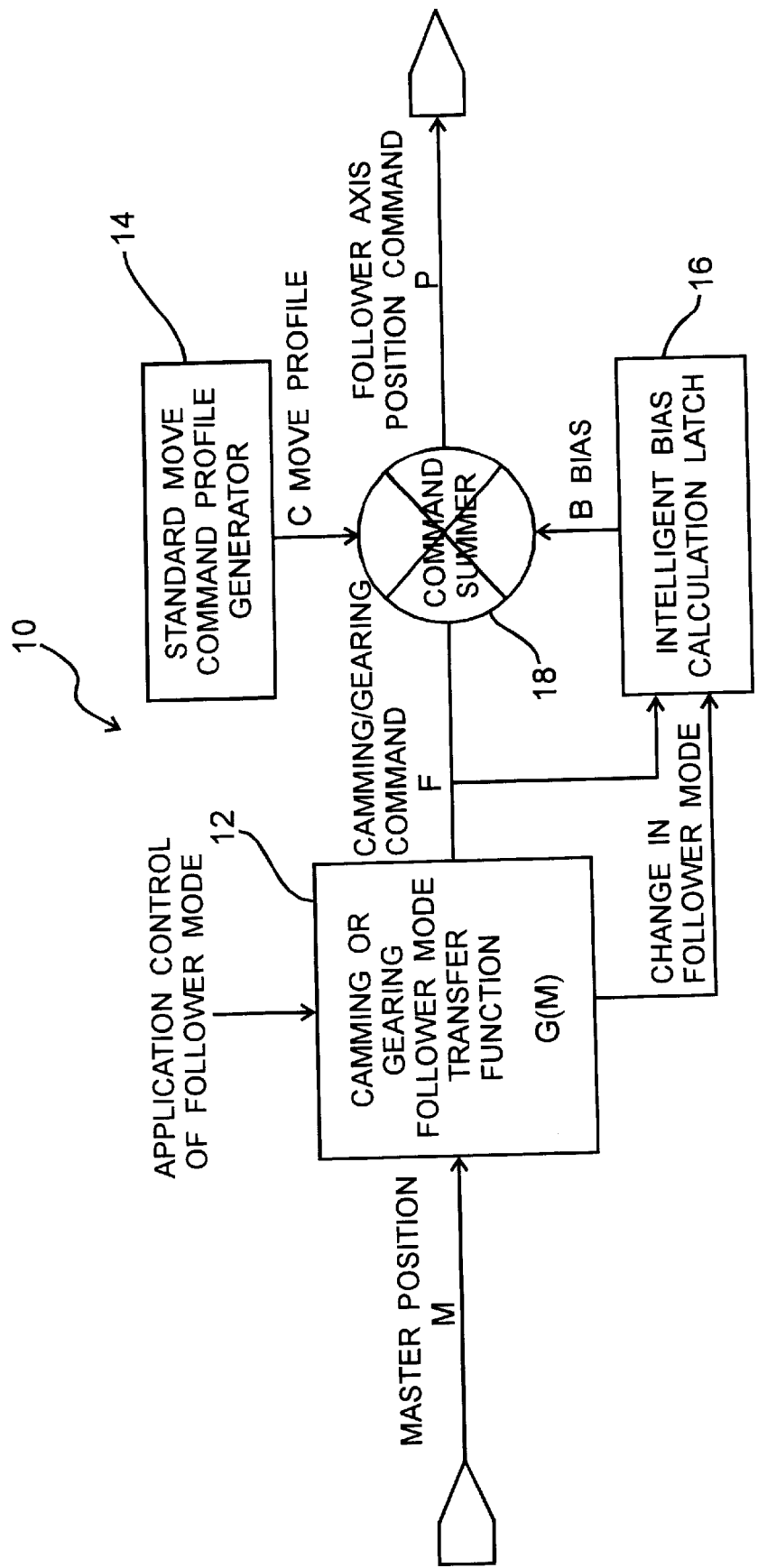
FIG. 1 is a block diagram of a motion controller of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In its preferred form, the present invention is described in terms of controlling an axis which follows, or moves in response to the position of another axis. However, the principles discussed can be used to control more than one or two axes. An axis represents a range of physical movement of an element (e.g., a gear, or assembly line track). Movement of an axis can be linear, rotational, or even more complex positioning of a tool or device.

The motion of a first, or master axis, is controlled or monitored to provide a position value at a given moment. A second, or follower axis, when utilizing a follower mode of operation, is controlled to move in response to the position of the master axis. That is, a transfer function is applied that takes a master axis position and produces a desired follower axis position. The follower mode of the follower axis is preferably in the form of electronic gearing or electronic camming. However, other modes can be utilized.

Electronic gearing occurs when the follower mode transfer function ("G(master axis position), or G(M)") is a constant multiplier ("R") times the master axis position:

$$G(M) = R \times \text{master axis position}$$

The gearing ratio is changed by changing the value of the constant multiplier R.

Electronic camming occurs when a cam profile is stored in a lookup table that relates the desired follower axis position for a given position of the master axis. In this instance, the follower mode transfer function is:

$$G(M) = \text{LookupTable}(\text{master axis position})$$

Missing points in the table can be filled in by interpolating such points from given points in the lookup table. For example, a linear or cubic interpolation can be utilized with given points in the lookup table to provide a transfer function position value for a master axis position value which is not one of the given points in the lookup table.

A change in the follower mode can result in a discontinuous position value being generated to the follower axis. The follower mode can change by simply turning the follower mode "on" and "off." Alternatively, the follower mode can change by switching between electronic gearing and electronic camming, changing the gearing ratio, changing the cam profile lookup table, or changing the master axis. The present invention prevents the follower axis from attempting to immediately jump to the desired position according to the new mode selected.

Referring to FIG. 1, a motion controller 10 is graphically represented in block diagram format. The controller 10 includes a follower mode transfer function circuit 12, which can be either hard wired or a software routine. The follower mode transfer function circuit generates a desired position value or command ("F") in response to a first, or master, axis position value or command ("M"). Depending on the current follower mode selected, the transfer function position value F can be the result of an electronic gearing operation, an electronic camming operation, or any other operation which depends on the master axis position. That is:

$$F = G(M)$$

The controller 10 further includes a standard move command profile generator circuit 14. This circuit generates a move profile value or command ("C") which smoothly moves the follower axis in addition to the motion resulting from applying the transfer function to the master axis position M.

The controller 10 also includes an intelligent bias calculation latch circuit 16 which outputs a bias value or command ("B"). The latch receives input as to changes in the follower mode, and the transfer function position value F.

Finally, the controller 10 includes a command summer 18, which receives as inputs the transfer function position value F as a first position value, the bias value B as a second position value, and the move profile position value C as a third position value. The summer 18 generates a second, or follower, axis position value or command ("P") in response to these inputs. Specifically, the equation of motion for the follower axis position value P as given in FIG. 1 is the sum of the transfer function position value F, the move profile position value C, and the bias output B from the intelligent bias calculation latch, or:

$$P = F + C + B.$$

The intelligent latch 16 calculates a bias value B which offsets the change in position resulting from a change in the follower mode. As explained above, changes in the follower mode are turning it "on" or "off," changing the cam profile to a different profile, changing the gearing ratio to a different ratio, changing from camming to gearing or gearing to camming, and changing the master axis. A cam profile can change by changing from a first profile stored in memory to a second profile stored in the memory. Alternatively, the profile can change by writing over a first profile with a second profile at the same memory location.

The intelligent latch 16 generates a bias output value that cancels or offsets the change in the transfer function position value that occurs from the change in the follower mode. For example, when the follower mode changes from "off" (G=0, F=0, B=0, P=C) to "on" (G=non-zero, F=G(M)) then the intelligent Latch calculates the bias as B=−F. With this value:

$$P = C + F + (-F) = C$$

Accordingly, there is no change in the value of P resulting from turning the follower mode "on" no matter what the master axis position value M, or the transfer function position value F are for the follower mode. This prevents generating a discontinuous position command to the follower axis when the follower mode is turned "on," and avoids the need to position the follower axis to the correct position before turning the follower mode "on" to avoid a jerk in the follower axis.

More generally, when the transfer function is changed to a new transfer function $G_{new}$, from some previous transfer function $G_{prev}$ (i.e., a change in the follower mode), the intelligent latch 16 calculates a new bias value B such that there is no change in the follower axis position command P when using the new transfer function by using:

$$P_{prev} = C + G_{prev}(M_{prev}) + B_{prev};$$

for the previous transfer function, and $$P_{new} = C + G_{new}(M_{prev}) + B_{new};$$

for the new transfer function. Where to avoid a position change at the time the mode changes (i.e., have $P_{prev} = P_{new}$, for the last position sample time), the latch calculates a new bias as:

$$B_{new} = G_{prev}(M_{prev}) - G_{new}(M_{prev}) + B_{prev}.$$

This calculation is also used to allow a master axis to be changed to a new master axis which may be at a different position $M_{new}$ than the previous master axis position $M_{prev}$. The above equations still apply, but in this instance the transfer functions $G_{prev}$ and $G_{new}$ have not changed and the master axis position is retrieved from a different master axis so:

$$P_{prev} = C + G_{prev}(M_{prev}) + B_{prev};$$

for the previous master axis position, and $$P_{new} = C + G_{prev}(M_{new}) + B_{new};$$

for the new master axis position. Where to avoid a discontinuous position change (again, have $P_{prev} = P_{new}$, for the last position sample time) the latch calculates a new bias value as:

$$B_{new} = G_{prev}(M_{prev}) - G_{prev}(M_{new}) + B_{prev}.$$

The addition of the intelligent bias latch 16 in the controller 10 allows changes in the follower mode transfer function to be accomplished with no disruption to the follower axis position commands. Additionally, such changes in the follower mode can occur while the follower mode is "on" and the follower axis and master axis are moving. Specifically, the addition of the latch means the follower axis does not have to be in the correct position to avoid jerks in the motion when changing the follower mode. This can prevent damage to a follower axis resulting from attempting to jump to a new desired position due to a change in the follower mode.

The motion controller can be configured to run through a number of algorithms to implement the functions described above. For example, every 2 milliseconds the controller can check the status of the mode and the position commands and implement any modifications necessary.

Figure 2:
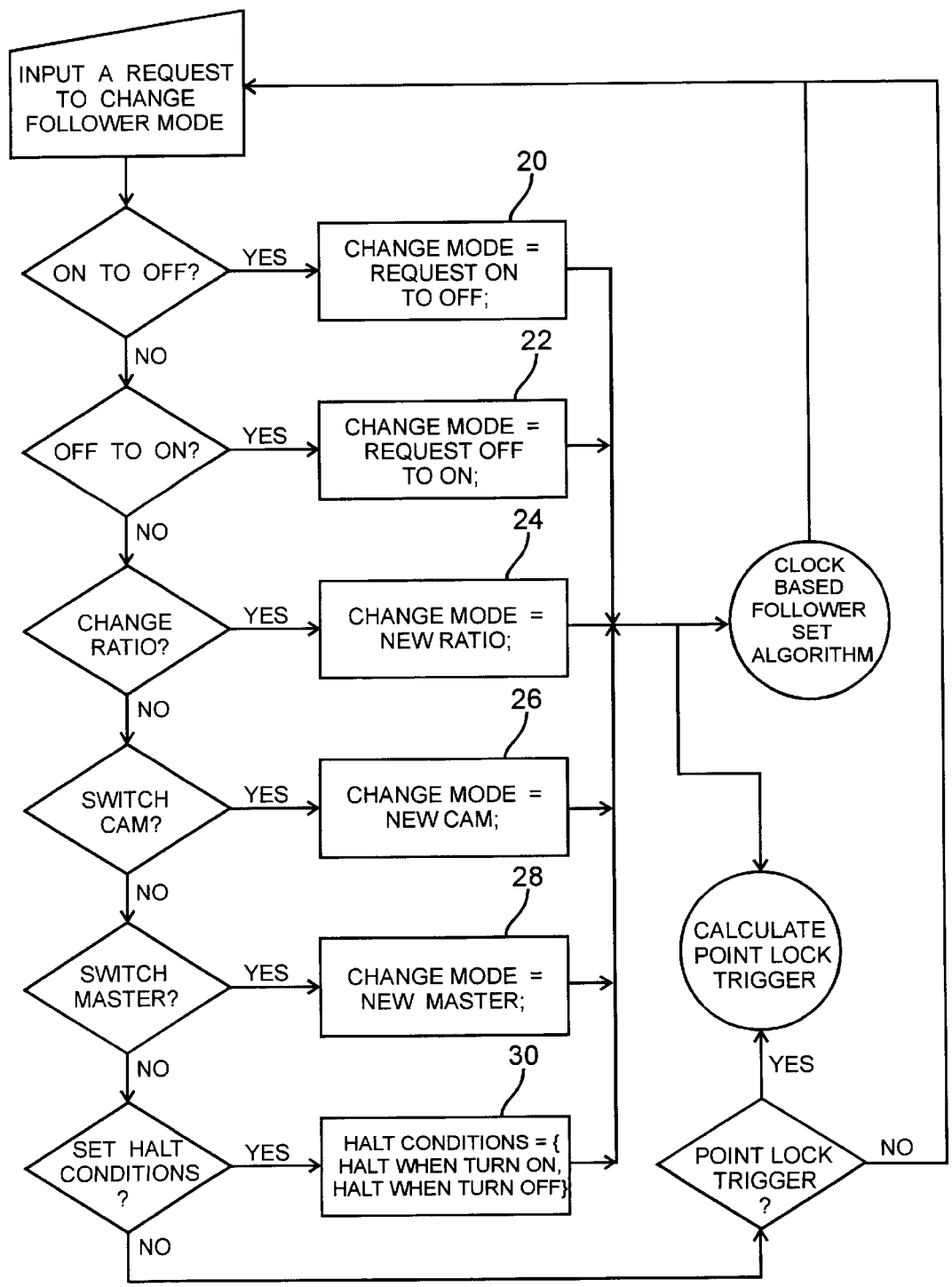
FIG. 2 is a block diagram of the new mode decision algorithm.

FIGS. 2–8 show the algorithms run by the controller 10. FIG. 2 shows the algorithm which determines whether a new mode is selected. The controller can switch the follower mode from "on" to "off" 20 or from "off" to "on" 22, change the ratio of the gearing 24, change the cam profile 26, or switch the master axis 28. The change ratio 24 and switch cam 26 decisions, can change the mode to the desired gearing ratio or cam profile, from any other mode the follower mode is in. As discussed further below, the halt conditions can be configured 30 as well.

Figure 3:
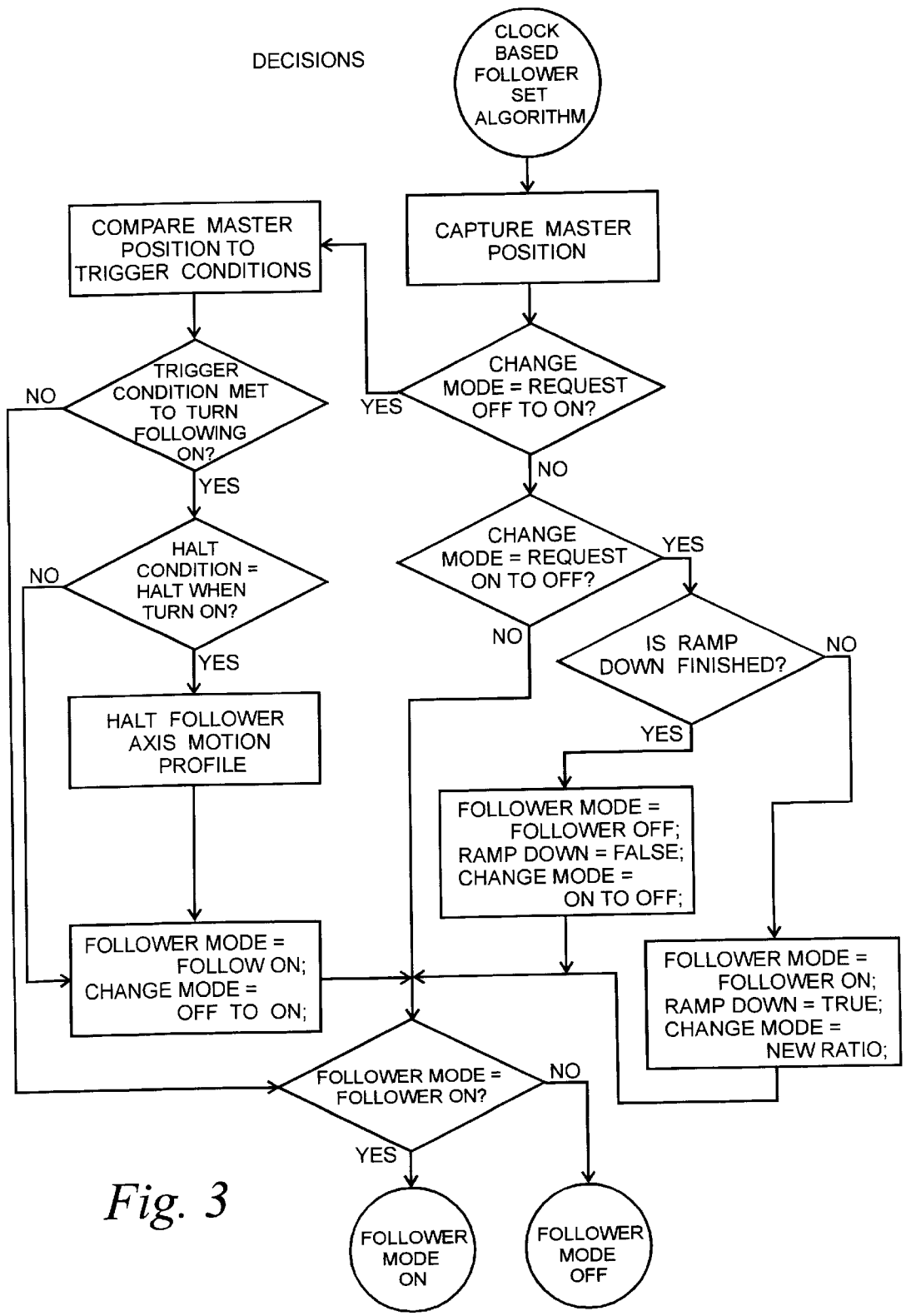
FIG. 3 is a block diagram of the follower mode on/off decision algorithm.
Figure 4:
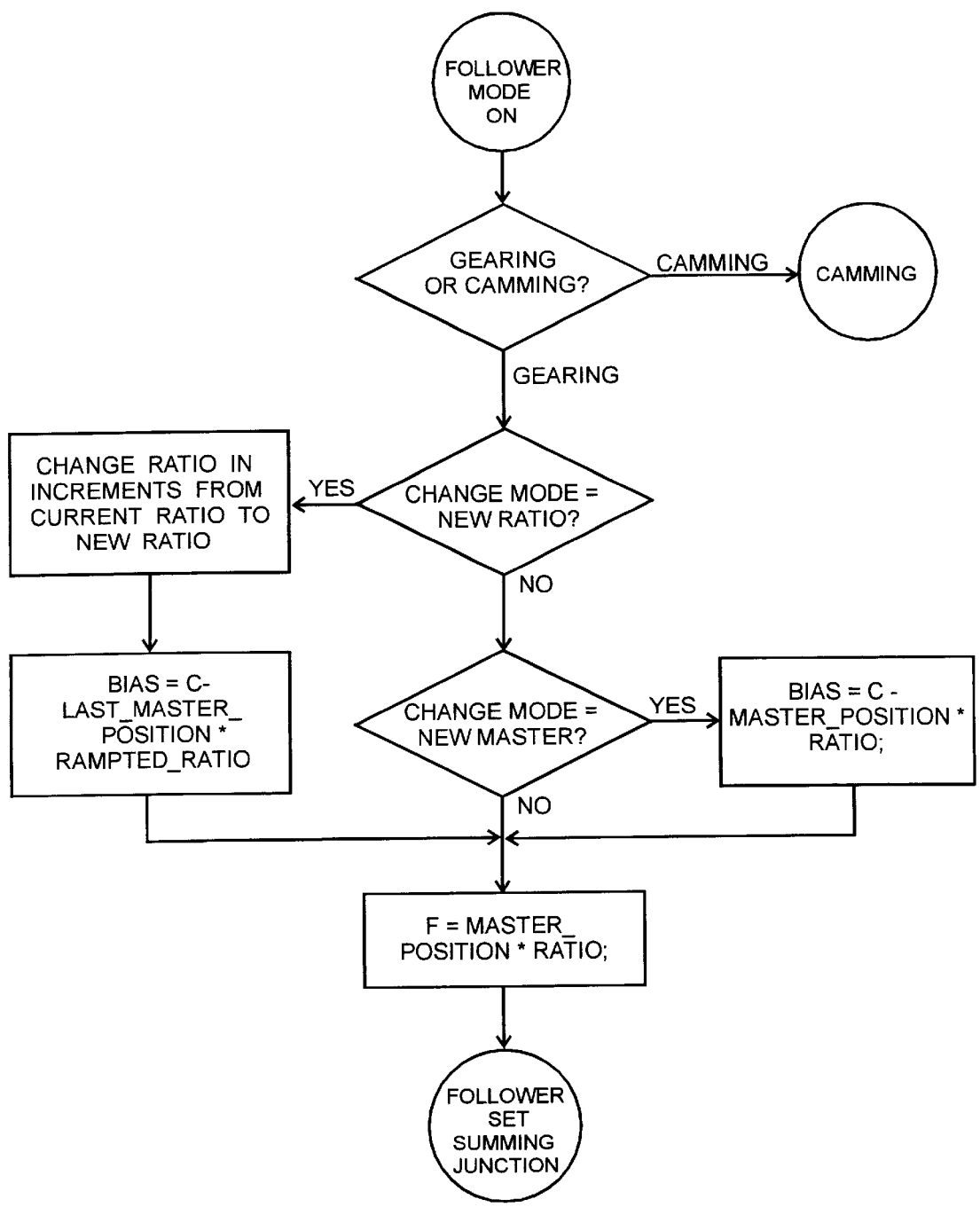
FIG. 4 is a block diagram of the gearing mode algorithm.
Figure 5:
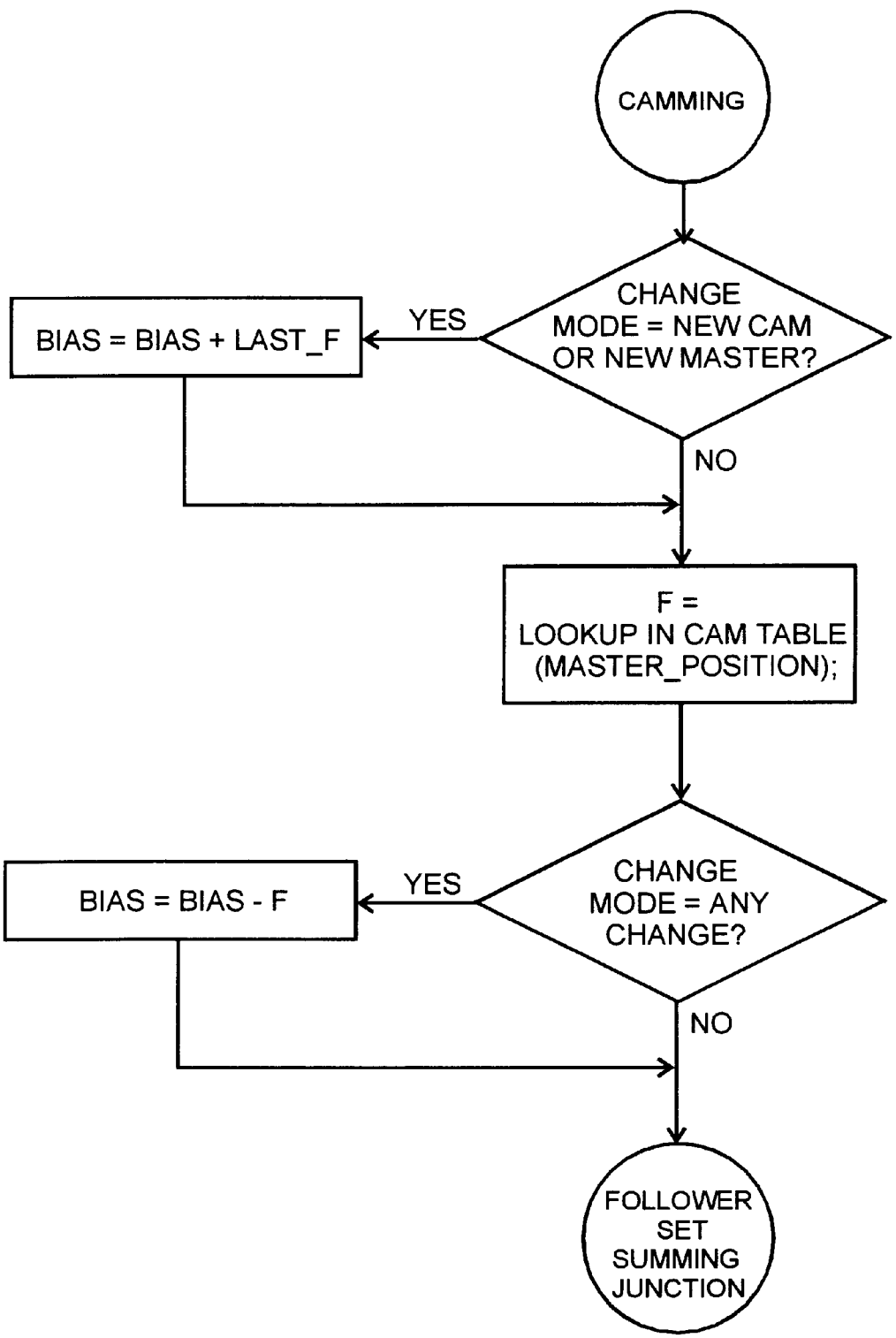
FIG. 5 is a block diagram of camming mode algorithm.
Figure 6:
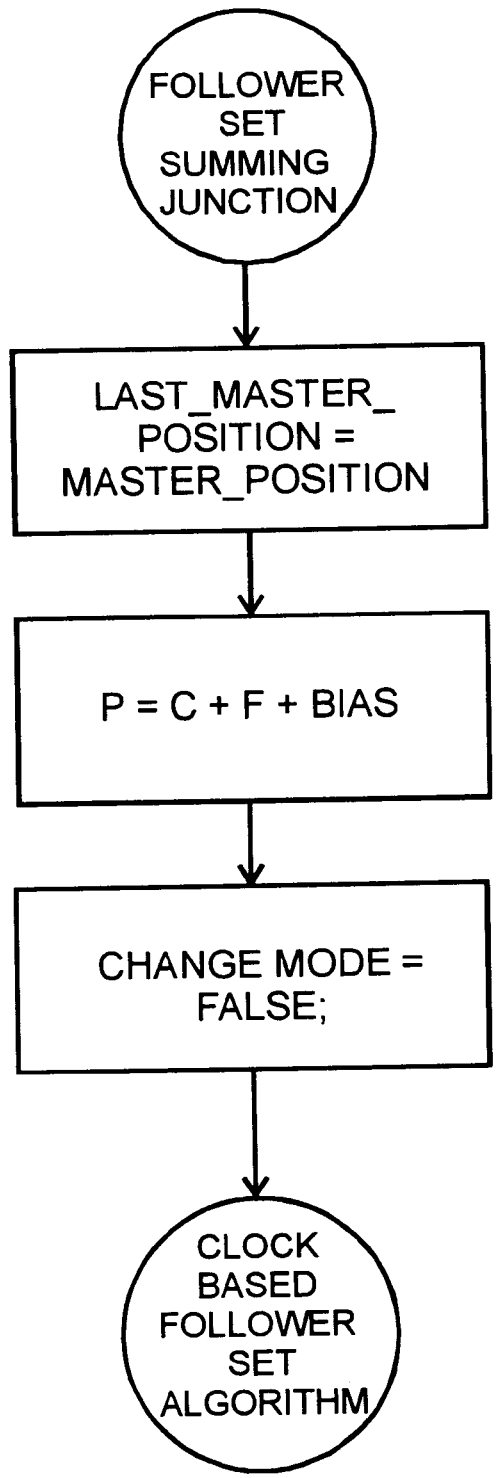
FIG. 6 is a block diagram of the command summer algorithm.
Figure 7:
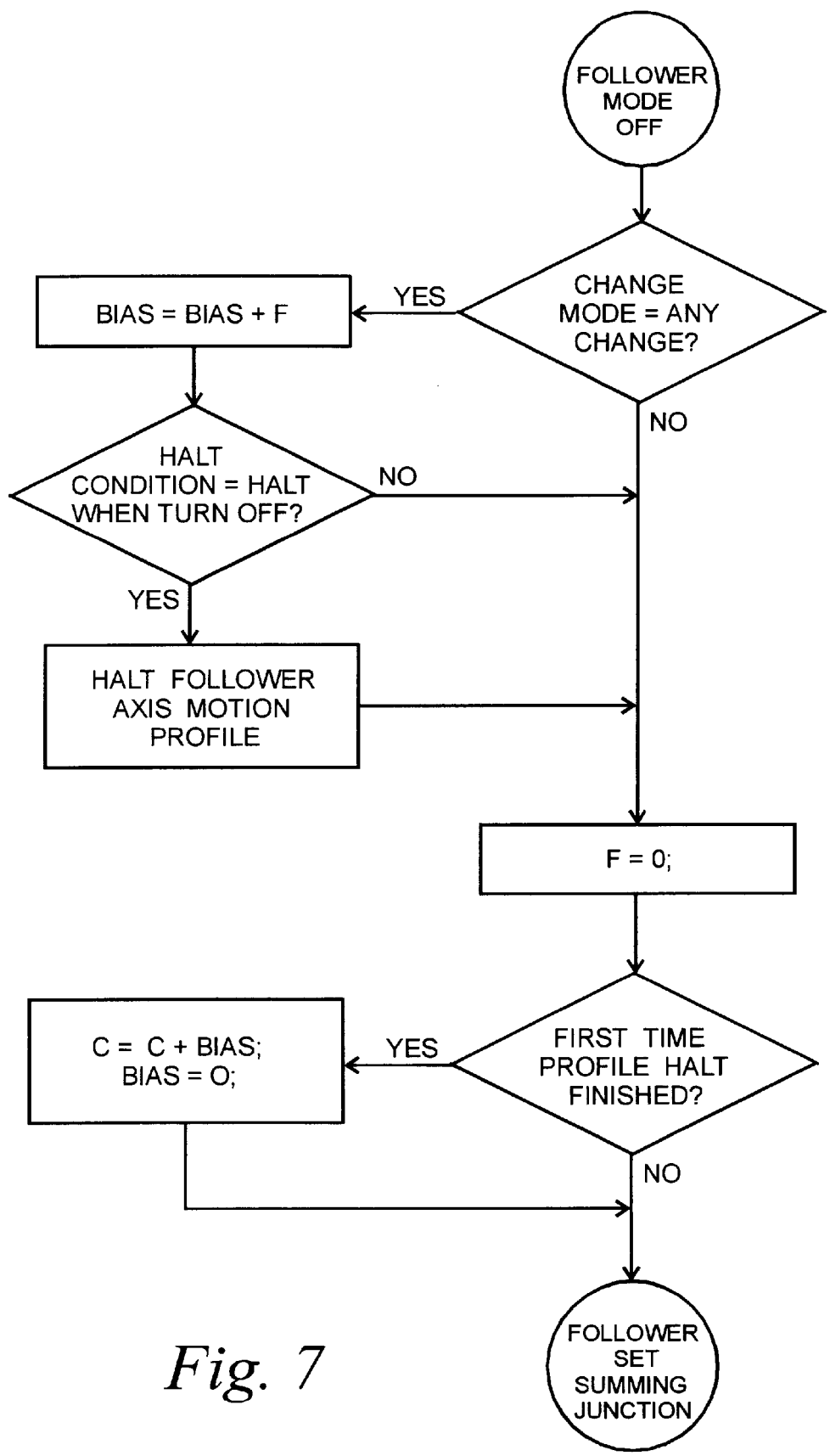
FIG. 7 is a block diagram of the following off mode algorithm.
Figure 8:
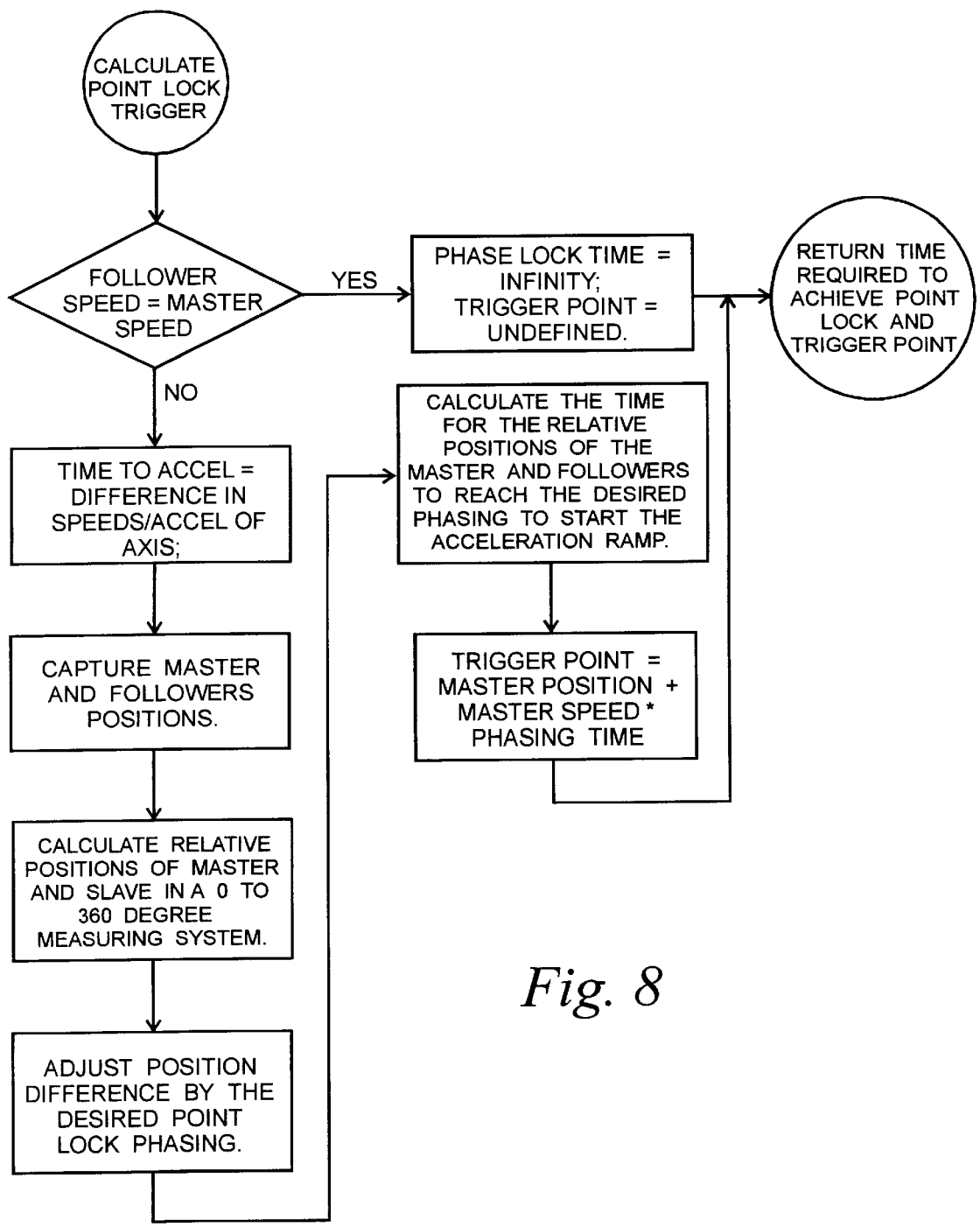
FIG. 8 is a block diagram of the point lock triggering algorithm.

FIG. 3 discloses the algorithm for changing the follower mode "on" and "off." FIGS. 4 and 5 show the algorithms for the gearing mode and camming mode, respectively. FIG. 6 shows the algorithm for the command summer 18. FIG. 7 shows the algorithm for turning the follower mode "off." FIG. 8 shows the point lock trigger algorithm which is described in detail below.

Figure 9:
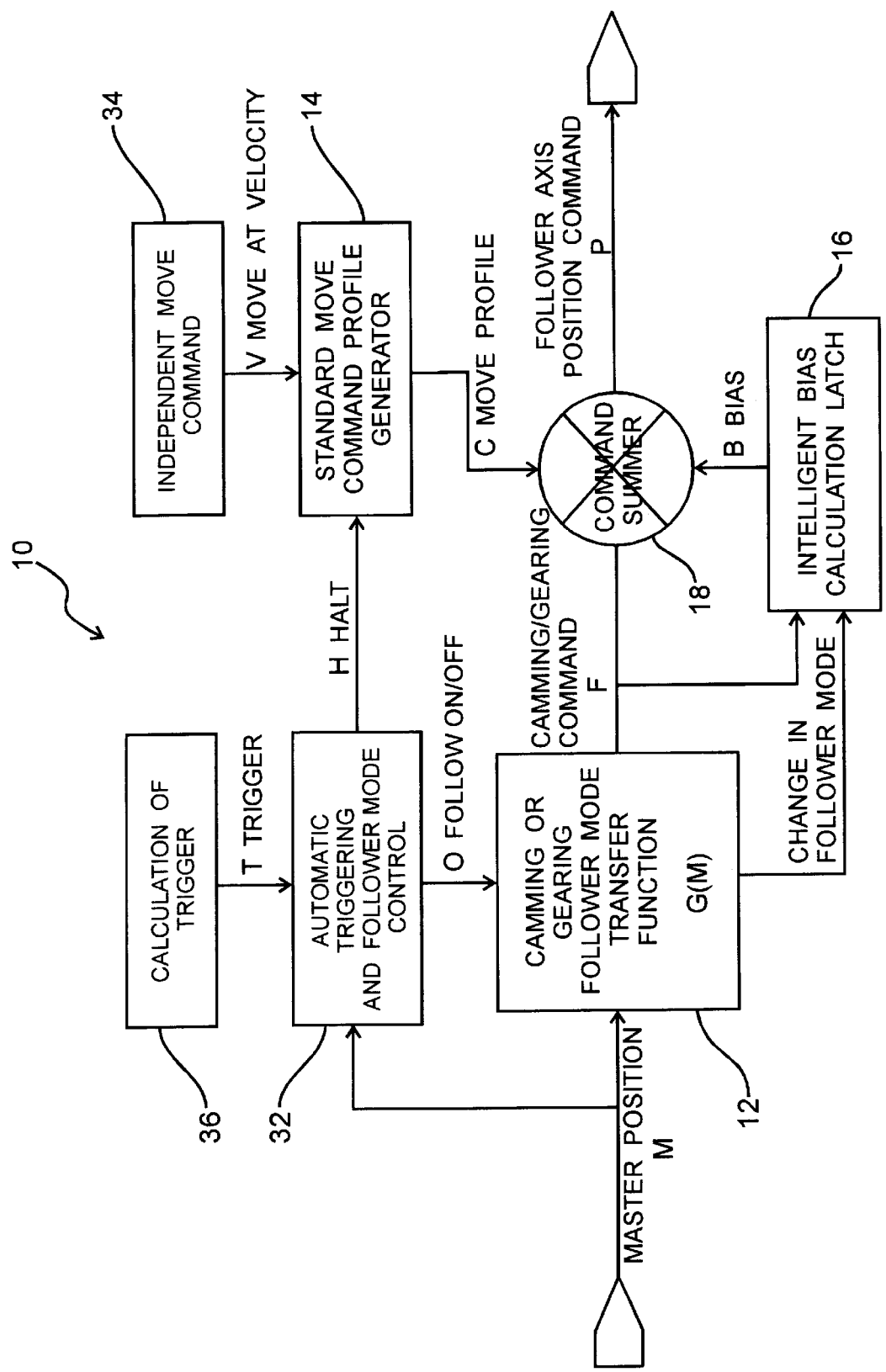
FIG. 9 is a block diagram of a further embodiment of the motion controller of the present invention.

In a further feature of the invention, referring to FIG. 9, an automatic triggering and follower mode control 32 produces a follower "on" or "off" enabling signal "O," received by the transfer function circuit 12, and a halt "on" or "off" command "H," received by the standard move command profile generator 14. It may be desired to turn the follow mode "off" such that the follower axis no longer responds to the master axis, however, allow the follower axis to continue at its current velocity (or other specified velocity).

An independent move command 34 produces a velocity output "V" (representing a current follower velocity or other specified velocity) which is received by the standard move command profile generator 14. When "H" is "off," the standard move command profile generator 14 allows "V" to affect the output "C." However, if "H" is "on," "V" has no effect on output "C," and thus "C" would remain constant. A default setup might specify that when the follower mode is turned "off", that "H" will be "on." Thus, "C" will be constant, "F" will be zero, and "B" will be constant, resulting in the follower axis ceasing to move. The feature allows "H" to be configured such that when the follower mode is turned "off," "H" is also "off," and "C" is then affected by "V." Since "F" would be zero, and "B" would be constant, the follower axis would be affected by "C" and would continue to move at the specified rate. It is understood that when the follower mode is changed from "on" to "off," the transfer function 12 ramps down during a deceleration period, and when "H" is changed from "on" to "off," the standard move command profile generator 14 ramps up during an acceleration period. The ramping rates may be synchronized such that a smooth transition occurs.

Another advantage of allowing "H" to be configured is that "H" can be turned "on" when the follower mode is turned "on." Once "H" is turned "on," "C" will be constant, and "F" will be generated by the transfer function 12. In this manner, the follower axis position command "P" will not experience a sudden increase as a result of summing "C" and "F" when the follower mode is turned "on" from a follower axis in-motion state. Thus, the follower mode can be turned "on" without stopping the axis prior to this change of mode. Again, when "H" is turned "on," "V" is ramped down during a deceleration period, according to a deceleration term, and "F" ramps up during an acceleration period, according to an acceleration term. The rates of the deceleration term and acceleration term can be equalized such that "P" will not experience sudden changes.

A further feature of the invention is the addition of trigger calculation circuitry 36. If the follower axis is in a moving state, but not following the master access (follower mode is turned "off"), the follower mode can be turned "on," while simultaneously turning the "H" command "on." "P" is then following "F," however, the follower axis may be out of synch with the master axis. The trigger calculation circuitry 36 takes all the current parameters into account, including the ramping terms, and determines at what time to turn the follower mode "on" such that after the ramping, the master axis and the follower axis will be in synch with one another. The following is an example of an algorithm for performing the triggering calculation, which one of ordinary skill in the art could readily surmise from the flow charts, the other functions having code similarly surmisable from their respective flow charts:

calcTriggerPointLock(FollowerSet& fset, Axis& master, Axis& slave, PositionUnits master_vel, PositionUnits slave_vel,

```
                PositionUnits& phase_adjust, PositionUnits& trigger, REAL& lock_time)
// this function calculates a trigger point on the master axis such that the slave is in point
// lock mode with a phase_adjust amount.
// Assumptions: 1) master is not a rollover axis. This allows the trigger to be set for more than one rev.
//              2) the slave does have rollovers set at 0–360 degrees
//              3) BOTH axes are rotary axes.
//              4) the phase_adjust is how much the master axis leads the slave
//              5) the master moves at a constant velocity
//              6) the slave is movinb at a constant velocity
//              7) the motion engine's internal units for rotary axes is revs
//              8) master and slave are going in same direction
// RETURNS: this function returns how long it will take to achieve the point lock into the lock_time
// variable. It returns TRUE as the return value, if the calculates say it can make the lock. It
// returns FALSE if it cannot calculate and achieve point lock. Note that
// when the master_vel and slave_vel are the same value, the time to achieve point lock mode
// goes to infinity. This function will return FALSE, with a very large time in that case.
// STRATEGY: this algorithm allows the axis to go into point lock mode by keeping the
```

-continued

```
// master and slave moving at their speeds until the master and slave get within the acceleration
// distance of each other, and then it accels up to the lock position. Since this is an open
// loop calculation and relies somewhat on the sampling of the master and slave positions
// being on same SERCOS tick (if off then that effects the accuracy of the lock), the lock
// position will be somewhat dependent on velocity and the SERCOS tick clock. In testing, the
// lock seemed to be good to 1-2 SERCOS ticks times the velocity of the slave. This strategy of
// waiting has the effect that if the slave is going at 0 speed, it waits until the master is just
// about to pass it, and then it accels. If they are both going at the same speed, then the master
// will never pass it, hence the check on the velocitys being the same (corrected by the follower_ratio).
  // allow for a non 1:1 FollowerRatio=> slave moves/ master_moves
    Ratio r = fset.getFollowerRatio( slave );
  REAL real_ratio = r.getNumerator( ).getInternal( )/r.getDenominator( ).getInternal( );
// first check for equal velocities
  if((real_ratio*master_vel) == slave_vel)
// does an automatic epsilon compare
      lock_time = FLT_MAX
      return boolFalse;
// we need the speeds for later
  REAL speed_from_master = fabs(real_ratio * master_vel.getInternal( ));
  REAL speed_from_slave = fabs(slave_vel.getInternal( ));
// compute the difference in the slave velocity and masters
  REAL delta_v = real_ratio*master_vel.getInternal( ) - slave_vel.getInternal( );
  REAL accel = slave.getAccel( ).getInternal( );
  if(delta_v < 0.0)
      accel = -accel; // we want a positive time.
  REAL accel_time = delta_v / accel;
// handle any roundoof
  if(accel_time < 0.0) accel_time = 0.0;
// now capture where the 2 axis are located right now.
  REAL pos_master_now = master.getUnrolledPosition( ).getInternal( );
  REAL pos_slave_now = slave.getPosition( ).getInternal( );
// the followerSet equation is => pos_slave = ratio * pos_master + bias
// so find out what the ratio * master term is
  REAL pos_master_gear = pos_master_now * real_ratio;
// the master is not doing rollovers, we assume a rotary axis 0-360 and get
// the factional rev part
  double int_part;
  REAL mod_pos = modf(pos_master_gear, &int_part);
// now effectively, both positions are 0 based so bias is 0. Find positional difference
  REAL pos_diff = pos_slave_now - mod_pos;
// adjust for any phase adjust
  REAL pos_slip = pos_diff + real_ratio*phase_adjust.getInternal( );
// this is algorithm that waits for the master and slaves phasing relationship (remember
// that they are both moving at different velocities so there relative positions to each
// other are constantly changing) to come around to near where point_lock mode is adjusted
// by the accel time.
  REAL slip_time = (pos_slip/delta_v) - 0.5 * accel_time;
// and now compensate for the accel/decel ramp canceling out
  if(speed_from_slave > speed_from_master)
      slip_time -= fabs(speed_from_master/accel);
  else
      slip_time -= fabs(speed_from_slave/accel);
// the above time can be negative but real time cannot. so if we simply add on how long
// the relative phasing of the master to slave from different velocities takes to get them
// back to these same rolled positions, we can get the time to be positive. In addition
// we want it greater than how long we can take to accel. Plus it has taken us some
// time to do these calculations, so we make the time be longer than 2 accel times
  REAL one_rev_time = 1.0 / fabs(delta_v);
  REAL two_accel_times = 2.0 * accel_time;
  while (slip_time < two_accel_times)
      slip_time += one_rev_time;
// the trigger position is the velocity * the slip_time away since at constant vel
  trigger = rev(pos_master_now + master_vel.getInternal( )*slip_time);
  lock_time = slip_time;
  return boolTrue;
```

While the specific embodiments have been illustrated and described, numerous modifications come to mind without significantly departing from the spirit of the invention, and the scope of protection is only limited by the scope of the accompanying claims.

We claim:

1. A motion controller which prevents a discontinuous position command to a follower axis when a follower mode is changed comprising:

a move profile generator which generates a move profile position value;

a transfer function position generator which generates a transfer function position value;

a latch which generates a bias position value; and a summer which generates a follower axis position value in response to said move profile position value, said transfer function position value and said bias position value.

2. The controller of claim 1 wherein said follower axis position value controls the position of said follower axis.

3. The controller of claim 1 wherein said transfer function position generator generates said transfer function position value in response to a master axis position value.

4. The controller of claim 3 wherein said transfer function position value is a constant multiplier value times said master axis position value.

5. The controller of claim 4 wherein said bias position value changes in response to a change in said constant multiplier value.

6. The controller of claim 3 wherein said transfer function position generator includes a first transfer function lookup table which provides a first transfer function position value in response to a particular master axis position value.

7. The controller of claim 6 wherein said transfer function position generator includes a second transfer function lookup table which provides a second transfer function position value in response to said particular master axis position value.

8. The controller of claim 7 wherein said bias position value changes in response to a change from said first lookup table to said second lookup table.

9. The controller of claim 1 wherein said bias position value offsets a change in said transfer function position value resulting from a change in said follower mode.

10. The controller of claim 9 wherein said bias position value is calculated in response to said change in said follower mode.

11. A motion controller comprising:
    circuitry for generating a first position value in response to a first axis position value;
    circuitry for generating a second position value which offsets a change in said first position value due to a change in a mode of operation of said circuitry for generating a first position value; and
    circuitry for generating a second axis position value in response to said first position value and said second position value.

12. The motion controller of claim 11 further comprising circuitry for generating a third position value wherein said circuitry for generating a second axis position value generates said second axis position value in response to said third position value in addition to said first position value and said second position value.

13. The motion controller of claim 12 wherein said first circuitry multiplies said first axis position value by a constant multiplier to generate said first position value.

14. The motion controller of claim 13 wherein said constant multiplier changes from a first value to a second value, and wherein said second position value changes in response to said change in said constant multiplier.

15. The motion controller of claim 12 wherein said circuitry for generating a first position value comprises a first lookup table for providing said first position value in response to said first axis position value.

16. The motion controller of claim 15 wherein said circuitry for generating a first position value comprises a second lookup table for providing said first position value in response to said first axis position value, and wherein said second position value changes in response to said circuitry for generating a first position value changing from utilizing said first lookup table to said second lookup table to provide said first position value.

17. A method of preventing a discontinuous position command to a follower axis when a follower mode is changed comprising the steps of:
    generating a move profile position value;
    providing a master axis position value;
    generating a transfer function position value in response to said master axis position value;
    generating a bias position value which offsets a change in said transfer function position value due to a change in said follower mode; and
    generating a follower axis position value in response to said move profile position value, said transfer function position value, and said bias position value.

18. The method of claim 17 wherein said follower axis position value controls the position of a follower axis.

19. The method of claim 17 wherein said generating a transfer function position value step comprises providing a first constant multiplier and multiplying said master axis position value by said first constant multiplier.

20. The method of claim 19 wherein said generating a transfer function position value step comprises providing a second constant multiplier and subsequently changing multiplying said master axis position value by said first constant multiplier value to said second constant multiplier.

21. The method of claim 20 wherein said generating a bias position value step comprises changing said bias position value in response to said change from said first constant multiplier to said second constant multiplier.

22. The method of claim 17 wherein said generating a transfer function position value step comprises providing a first lookup table which generates said transfer function position value in response to said master axis position value.

23. The method of claim 21 wherein said generating a transfer function value step comprises providing a second lookup table which generates said transfer function position value in response to said master axis position value, and changing from utilizing said first lookup table to said second lookup table.

24. The method of claim 17 wherein said generating a bias position value step comprises changing said bias position value in response to said changing from utilizing said first lookup table to said second lookup table step.

25. The method of claim 17 wherein said generating a bias position value step comprises changing said bias position value in response to a change of said follower mode.

26. The method of claim 25 wherein said follower mode changes from electronic gearing to electronic camming.

* * * * *